United States Patent
Zhou

(10) Patent No.: US 8,659,442 B2
(45) Date of Patent: *Feb. 25, 2014

(54) POWER-SAVING REMINDER CIRCUIT FOR COMPUTER

(75) Inventor: Hai-Qing Zhou, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 591 days.

This patent is subject to a terminal disclaimer.

(21) Appl. No.: 12/978,600

(22) Filed: Dec. 26, 2010

(65) Prior Publication Data

US 2012/0146801 A1    Jun. 14, 2012

(30) Foreign Application Priority Data

Dec. 14, 2010    (CN) .......................... 2010 1 0586849

(51) Int. Cl.
*G08B 21/00* (2006.01)

(52) U.S. Cl.
USPC ...................... 340/654; 340/691.1; 340/693.1

(58) Field of Classification Search
USPC ............ 340/654, 691.1, 693.1, 693.3, 636.6, 340/653, 815.4
See application file for complete search history.

(56) References Cited

U.S. PATENT DOCUMENTS

| | | | |
|---|---|---|---|
| 6,828,915 B2 * | 12/2004 | Gottlieb | 340/653 |
| 7,439,874 B2 * | 10/2008 | Sotiriou | 340/815.4 |
| 2005/0270169 A1 * | 12/2005 | Drader et al. | 340/691.1 |

* cited by examiner

*Primary Examiner* — Steven Lim
*Assistant Examiner* — Kaleria Knox
(74) *Attorney, Agent, or Firm* — Altis Law Group, Inc.

(57) ABSTRACT

An anode of a light emitting diode (LED) and a second terminal of a third electrical switch are connected to a first power source. First terminals of the first and second electrical switches are respectively connected to a second power source and a suspend signal pin. A second terminal of the first electrical switch is connected to a cathode of the LED and an output pin of a counter chip. A second terminal of a second electrical switch is connected to the first power source through a first resistor and a first terminal of the third electrical switch. A third terminal of the third electrical switch is grounded through second and third resistors and a capacitor in sequence and a voltage pin of the counter chip.

7 Claims, 1 Drawing Sheet

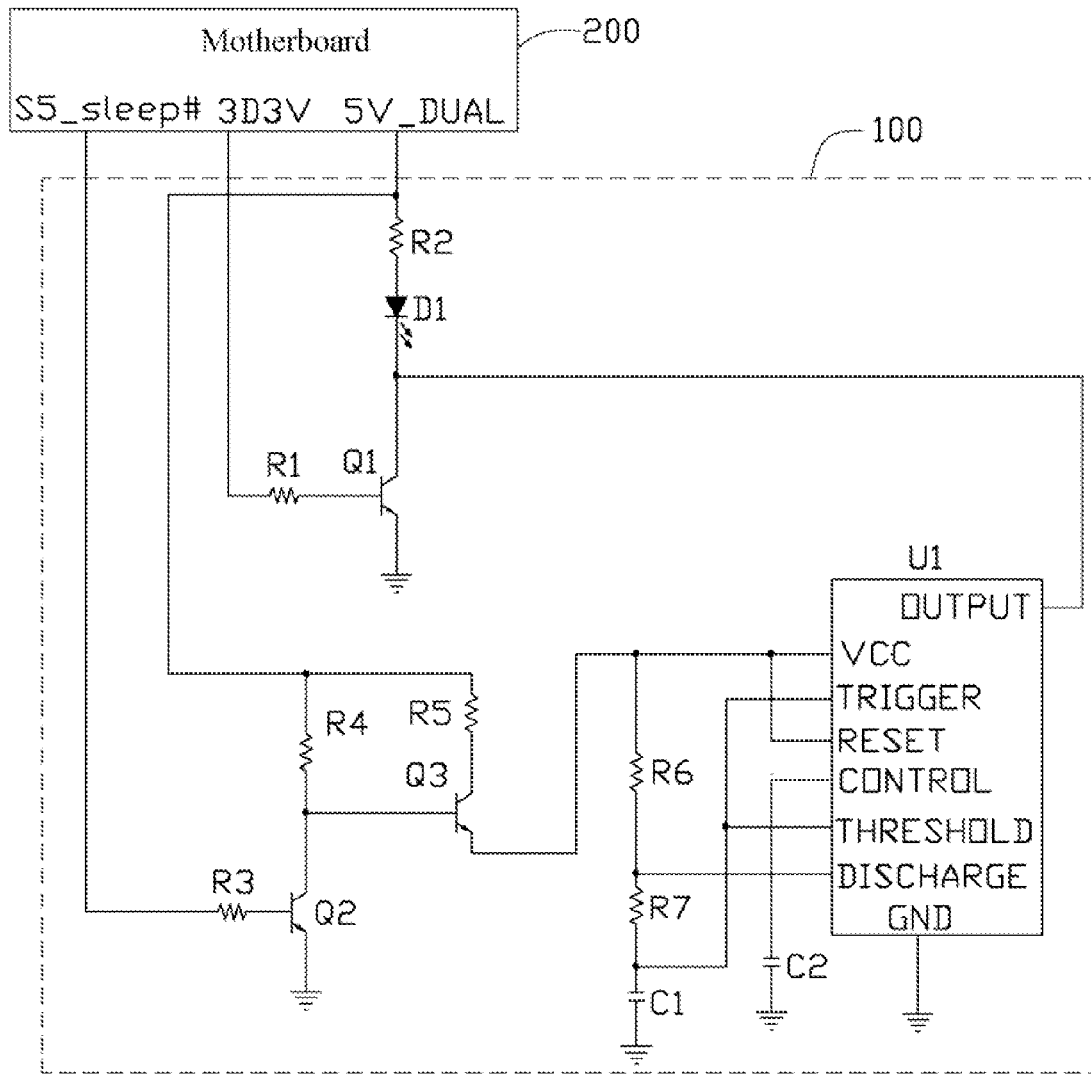

POWER-SAVING REMINDER CIRCUIT FOR COMPUTER

BACKGROUND

1. Field of the Invention

The present disclosure relates to reminder circuits, and particularly to a power-saving reminder circuit to remind users to shut off commercial power after a computer is powered off.

2. Description of Related Art

In a personal computer (PC) system, power management is adopted to conserve energy while the PC is in use it can be put to sleep to save energy when not in use. System power states derived from the advanced configuration and power interface (ACPI) specification are defined as follows:

S0/Working—The central processing unit (CPU) is fully up and operating; devices are powering up and down as needed.

S1—The CPU is stopped; the random access memory (RAM) is refreshed; the system is operating in a low power mode.

S2—The CPU has no power; the RAM is refreshed; the system is in a lower power mode than S1.

S3—The CPU has no power; the RAM is in slow refresh; the power supply is generally in a reduced power mode (for example, the power supply not supplying much power and is operating in a lower power efficiency mode).

S4—The hardware is completely off; the system memory has been saved to disk.

S5/Off—the hardware is completely off; the operating system has shut down; nothing has been saved.

When the computer is powered off and at the S5/off state, there is still a +5 volt standby voltage (+5VSB) applied to a motherboard for driving a basic power source control circuit of the computer system during the off state. However, this means the computer still consumes energy even in the off state, thus, commercial power needs to be shut off from the computer, to save more power, but the users usually forget to do this, thus, resulting in wasting electrical energy.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the several views.

The drawing is a circuit diagram of a power-saving reminder circuit for a computer in accordance with an exemplary embodiment of the present disclosure.

DETAILED DESCRIPTION

The disclosure, including the drawing, is illustrated by way of examples and not by limitation. It should be noted that references to "an" or "one" embodiment in this disclosure are not necessarily to the same embodiment, and such references mean at least one.

Referring to the drawing, a power-saving reminder circuit 100 for a computer in accordance with an exemplary embodiment includes a counter chip U1, capacitors C1 and C2, resistors R1-R7, electrical switches, such as npn transistors Q1-Q3, and a light emitting diode (LED) D1.

A base of the transistor Q1 is connected to a 3.3 volt (V) power source 3D3V of a motherboard 200 of the computer through the resistor R1. An emitter of the transistor Q1 is grounded. A collector of the transistor Q1 is connected to a cathode of the LED D1 and also connected to an output pin OUTPUT of the counter chip U1. An anode of the LED D1 is connected to a 5V power source 5V_DUAL of the motherboard 200 through the resistor R2. A base of the transistor Q2 is connected to a suspend signal pin S5_sleep# of the motherboard 200 through the resistor R3. An emitter of the transistor Q2 is grounded. A collector of the transistor Q2 is connected to a base of the transistor Q3 and is connected to the 5V power source 5V_DUAL through the resistor R4. A collector of the transistor Q3 is connected to the 5V power source 5V_DUAL through the resistor R5. An emitter of the transistor Q3 is grounded through the resistors R6 and R7 and the capacitor C1 connected in series and connected to the voltage pin VCC of the counter chip U1. A reset pin RESET of the counter chip U1 is connected to the voltage pin VCC. A trigger pin TRIGGER and a gate pin THRESHOLD of the counter chip U1 are connected together and then connected to a node between the resistor R7 and the capacitor C1. A discharge pin DISCHARGE of the counter chip U1 is connected to a node between the resistors R6 and R7. A control pin CONTROL of the counter chip U1 is grounded through the capacitor C2. A ground pin GND of the counter chip U1 is grounded. In one embodiment, the counter chip U1 is an NE555 counter chip.

In use, when the motherboard 200 is powered on and at the S0/working state, the base of the transistor Q1 receives a high level signal from the 3.3V power source 3D3V of the motherboard 200, and the transistor Q1 is turned on. The LED D1 is lit. The base of the transistor Q2 receives a high level signal from the suspend signal pin S5_sleep# of the motherboard 200, and the transistor Q2 is turned on. A collector of the transistor Q2 is at a low level signal. The base of the transistor Q3 receives the low level signal from the collector of the transistor Q2, and the transistor Q3 is turned off. The voltage pin VCC of the counter chip U1 does not receive a voltage, thus, the counter chip U1 does not work. Therefore, the LED D1 is always lit when the motherboard 200 is at S0/working state.

When the motherboard 200 is powered off and at S5/off state, the 3.3V power source 3D3V does not output the 3.3V voltage, the base of the transistor Q1 does not receive a voltage, and the transistor Q1 is turned off. The LED D1 does not light. The base of the transistor Q2 receives a low level signal from the suspend signal pin S5_sleep# of the motherboard 200, and the transistor Q2 is turned off. The base of the transistor Q3 receives a high level signal from the 5V power source 5V_DUAL, and the transistor Q3 is turned on. The voltage pin VCC of the counter chip U1 receives a voltage and the counter chip U1 is powered on. At the same time, the capacitor C1 is charged through the resistors R6 and R7. When a voltage of the capacitor C1 reaches ⅔ of the voltage of the counter chip U1, the output pin OUTPUT of the counter chip U1 outputs a low level signal. The LED D1 is lit. At the same time, the discharge pin DISCHARGE of the counter chip U1 is turned on, and the capacitor C1 discharges through the resistor R7. When the voltage of the capacitor C1 is reduced to ⅓ of the counter chip U1, the output pin OUTPUT of the counter chip U1 outputs a high level signal. The LED D1 does not light. And after, the capacitor C1 is charged and discharged again, the theory is same as above. Therefore, the LED D1 is in a blinking state when the motherboard 200 is at S5/off state, to remind of the users to shut off commercial power from the computer to save more power.

In some embodiments, light frequency and time of the LED D1 can be changed through changing values of the resistors R6 and R7 and the capacitor C1.

The power-saving reminder circuit 100 can remind users to shut off commercial power through the blinking of the LED D1 when the computer is powered off and at S5/off state, to save more power.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power-saving reminder circuit for a computer with a motherboard, the power-saving reminder circuit comprising:
   a light emitting diode (LED) comprising a cathode and an anode, wherein the anode of the LED is connected to a first power source of the motherboard;
   a counter chip comprising an output pin, a voltage pin, a reset pin, a trigger pin, a gate pin, and a discharge pin;
   a first electrical switch comprising first to third terminals, the first terminal of the first electrical switch is connected to a second power source of the motherboard, the third terminal of the first electrical switch is grounded, the second terminal of the first electrical switch is connected to the cathode of the LED and also connected to the output pin of the counter chip;
   a second electrical switch comprising first to third terminals, wherein the first terminal of the second electrical switch is connected to a suspend signal pin of the motherboard, the third terminal of the second electrical switch is grounded, the second terminal of the second electrical switch is connected to the first power source of the motherboard through a first resistor; and
   a third electrical switch comprising first to third terminals, wherein the first terminal of the third electrical switch is connected to the second terminal of the second electrical switch, the second terminal of the third electrical switch is connected to the first power source of the motherboard, the third terminal of the third electrical switch is grounded through a second resistor, a third resistor, and a first capacitor connected in series and also connected to the voltage pin of the counter chip, the reset pin of the counter chip is connected to a node between the voltage pin of the counter chip and the second resistor, the trigger pin and the gate pin of the counter chip are connected to a node between the third resistor and the first capacitor, the discharge pin of the counter chip is connected to a node between the second and the third resistors;
   wherein when the motherboard is powered on, the first and the second electrical switches are turned on, the third electrical switch is turned off, the counter chip does not work, the LED is lit; and
   wherein when the motherboard is powered off, the first and the second electrical switches are turned off, the third electrical switch is turned on, the first capacitor charges and discharges to make the counter chip control the LED to turn on and off.

2. The power-saving reminder circuit of claim 1, wherein the first to third electrical switches are npn transistors, the first to third terminals of the first to third electrical switches corresponds to bases, collectors, and emitters, respectively, of the transistors.

3. The power-saving reminder circuit of claim 1, further comprising fourth to seventh resistors, wherein the fourth resistor is connected between the first terminal of the first electrical switch and the second power source, the fifth resistor is connected between the anode of the LED and the first power source, the sixth resistor is connected between the first terminal of the second electrical switch and the suspend signal pin of the motherboard, the seventh resistor is connected between the second terminal of the third electrical switch and the first power source.

4. The power-saving reminder circuit of claim 1, further comprising a second capacitor, the second capacitor is connected between a control pin of the counter chip and ground.

5. The power-saving reminder circuit of claim 1, wherein the counter chip is an NE555 counter chip.

6. The power-saving reminder circuit of claim 1, wherein the first power source is a 3.3 volt power source.

7. The power-saving reminder circuit of claim 1, wherein the second power source is a 5 volt power source.

* * * * *